UNITED STATES PATENT OFFICE.

JAMES M. FLAGG, OF PROVIDENCE, RHODE ISLAND.

IMPROVEMENT IN OIL-PROOF RUBBERS FOR STEAM-PACKING, &c.

Specification forming part of Letters Patent No. 118,004, dated August 15, 1871.

*To all whom it may concern:*

Be it known that I, JAMES M. FLAGG, of Providence, in the county of Providence and State of Rhode Island, have invented a new and useful Improvement in Oil-Proof Rubber; and I do hereby declare that the following is a full, clear, and exact description thereof, which will enable others skilled in the art to make and use the same.

My invention has for its object to furnish an improved preparation of rubber for carriage-washers, gaskets, belting, and other purposes, where rubber comes in contact with oil, and which shall be so prepared that the oil will not affect the prepared rubber.

My invention consists in combining aluminous clay with vulcanized rubber, as hereinafter fully described and subsequently pointed out in the claim.

The clay which I preferably use contains by analysis about thirty-nine per cent. alumina, forty-six per cent. of silica, thirteen per cent. of water, and about two per cent., or a mere trace, of iron, magnesia, and lime. Any appreciable quantity of these last-mentioned substances would defeat the object in view, since they would lump and form a gritty surface, and their particles would not contact with sufficient closeness to exclude oil.

In preparing this improved rubber argillaceous clay is mixed with the caoutchouc and sulphur, which mixture is then prepared and vulcanized in the ordinary manner, according to the particular use to which it is to be applied. Plumbago may be added to the mixture, or not, according to the use to which the rubber is to be applied.

For carriage-washers the compound is vulcanized upon an arbor, and washers of the desired thickness are afterward cut off.

Having thus described my invention, I claim as new and desire to secure by Letters Patent—

The combination of clay with vulcanized rubber, in the manner and for the purpose specified.

JAMES M. FLAGG.

Witnesses:
M. M. BURDICK,
H. H. WYATT.